(12) United States Patent
Hama

(10) Patent No.: US 9,166,503 B2
(45) Date of Patent: Oct. 20, 2015

(54) ACTUATOR CONTROL SYSTEM AND ACTUATOR SYSTEM

(75) Inventor: Nobuharu Hama, Ohyasumi Iida (JP)

(73) Assignee: Tamagawa Seiki Co., Ltd., Nagano (JP)

( * ) Notice: Subject to any disclaimer, the term of this patent is extended or adjusted under 35 U.S.C. 154(b) by 0 days.

(21) Appl. No.: 13/386,545

(22) PCT Filed: Nov. 10, 2010

(86) PCT No.: PCT/JP2010/070056
§ 371 (c)(1),
(2), (4) Date: Feb. 27, 2012

(87) PCT Pub. No.: WO2012/014338
PCT Pub. Date: Feb. 2, 2012

(65) Prior Publication Data
US 2012/0187885 A1    Jul. 26, 2012

(30) Foreign Application Priority Data

Jul. 26, 2010    (JP) .................................. 2010-167643

(51) Int. Cl.
*G01R 31/02*    (2006.01)
*H02P 5/00*    (2006.01)
*H02J 13/00*    (2006.01)

(52) U.S. Cl.
CPC ............... *H02P 5/00* (2013.01); *H02J 13/0031* (2013.01)

(58) Field of Classification Search
USPC ................................. 318/490, 491; 340/855.2
See application file for complete search history.

(56) References Cited

FOREIGN PATENT DOCUMENTS

| JP | 07-077542 | | 3/1995 |
|---|---|---|---|
| JP | 07077542 A | * | 3/1995 |
| JP | 08-313566 | | 11/1996 |
| JP | 08313566 A | * | 11/1996 |
| JP | 11-299291 | | 10/1999 |
| JP | 2011-295371 | | 10/1999 |
| JP | 11295371 A | * | 10/1999 |
| JP | 2000-262014 | | 9/2000 |
| JP | 2005218240 A | * | 8/2005 |
| JP | 2010-110116 | | 5/2010 |
| JP | 2010-252411 | | 11/2010 |
| JP | 2010252411 A | * | 11/2010 |

OTHER PUBLICATIONS

International Search Report mailed Mar. 1, 2011 for International Application No. PCT/JP2010/070056.

* cited by examiner

*Primary Examiner* — Rina Duda
*Assistant Examiner* — Bickey Dhakal
(74) *Attorney, Agent, or Firm* — Fay Sharpe LLP

(57) ABSTRACT

An actuator control system includes a controlling controller and one or more driving controllers connected to the controlling controller via a power line, wherein the controlling controller generates a serial signal that composites a power-supply voltage to be supplied to an actuator and a command signal generated in order to control driving of the actuator and transmits the generated serial signal to the driving controllers via the power line, and the driving controllers separate and retrieve the power-supply voltage and the control signal. Due to the configuration described above, the driving controllers supply a drive voltage and a drive control signal to actuators connected thereto. Accordingly, an actuator control system can be provided whose amount of installed wiring has been significantly reduced.

9 Claims, 7 Drawing Sheets

ACTUATOR CONTROL SYSTEM AND ACTUATOR SYSTEM

TECHNICAL FIELD

The present invention relates to an actuator control system and an actuator system and, more particularly, to an actuator control system and an actuator system which control a plurality of actuators such as motors using an actuator controller for a motor controller and which are capable of significantly reducing an amount of installed wiring and, in turn, preventing improper wiring, reducing wiring weight, reducing wiring installation man-hours, and trimming cost.

BACKGROUND ART

Conventionally, when controlling driving of respective motors in a motor system configured such that a plurality of motors is to be controlled by a control function, a large amount of wiring such as a power supply, a signal cable, a power line to the motor, and an encoder signal line is necessary for each motor's motor controller installed near a personal computer, a sequencer, or the like that is the control function.

FIG. 4 is a configuration diagram illustrating an example of a conventional motor system. In the diagram, the conventional motor system is configured such that motor controllers 230A, 230B, 230C, . . . for respectively controlling motors 300A, 300B, 300C, . . . are respectively connected to a serial signal generator 200 that is a personal computer or the like, each of the motor controllers 230A and the like are connected in parallel to a direct-current power supply 400, the respective motor controllers 230A and the like and the respective motors 300A and the like are connected with each other by cables 900A, 900B, 900C, . . . , and encoders 330A or the like are attached to the motors 300A and the like as appropriate and connected to the motor controllers 230A and the like and the motors 300A and the like by cables 930A and the like. The motor controllers 230A and the like are all installed in the vicinity of the serial signal generator 200, and for each of the motor controllers 230A and the like, wiring for a power supply, a signal cable, a power line to the motor, and an encoder signal line must be provided over a long distance to the motors 300A and the like that are respective control objects.

Among prior art related to configurations of such motor systems, for example, a proposal disclosed in Japanese Patent Laid-Open No. 2000-262014 (Patent Document 1) is related to a method of controlling motors integrated with amplifiers, wherein the method uses a LAN for wiring-laborsaving, and a controller and each motor integrated with an amplifier are connected by serial communication. In addition, a proposal disclosed in Japanese Patent Laid-Open No. H11-299291 (Patent Document 2) similarly reduces wiring by adopting serial communication between respective units.

PRIOR ART DOCUMENTS

Patent Documents

Patent Document 1
  Japanese Patent Laid-Open No. 2000-262014. "MOTOR INTEGRATED WITH AMPLIFIER AND GROUP MANAGEMENT AND CONTROL SYSTEM FOR MOTOR-AMPLIFIER". Abstract, Claims, Detailed Description of the Invention (paragraphs 0015 to 0023), and FIGS. 2 and 8.

Patent Document 2
  Japanese Patent Laid-Open No. 11-299291. "MULTI-SHAFT MOTOR CONTROLLER". Abstract, Claims, and FIG. 1.

DISCLOSURE OF THE INVENTION

Problems to be Solved by the Invention

However, since both of the two prior art examples described above involves connecting a controller and respective motors or the like by serial communication, a high level of wiring-laborsaving is not achieved and operational advantages are insufficient.

An object of the present invention is to eliminate the problem found in prior part described above, and to provide an actuator control system and an actuator system capable of significantly reducing an amount of installed wiring and, in turn, preventing improper wiring, reducing wiring weight, reducing wiring installation man-hours, and trimming cost.

It is also an object of the present invention to provide an actuator control system and an actuator system capable of favorably compositing a command (control) and a power supply voltage (power), having an actuator separate the composite command and power supply voltage and interpret the separated command as a command intended to the actuator itself in order to operate favorably and, at the same time, transmitting information regarding trouble occurring at the actuator and an angle of rotation or the like of the actuator itself to a command side.

Means for Solving the Problems

After a study of the objects described above, the present inventor found that the problem described above can be solved by processing voltage transmitted by a power line for driving an actuator such as a motor in order to provide an actuator control function, and the present invention has been made accordingly. Specifically, the invention claimed or at least disclosed in the present application as means for solving the problem described above is as follows.

(1) An actuator control system including a controlling controller, one or more driving controllers, and a power line for connecting the two controllers, wherein
  the controlling controller includes
  a controlling arithmetic circuit that generates a command signal or, in other words, a control signal for actuator control, and
  a polarity reversion circuit for generating a serial signal that composites a control signal and a power-supply voltage (power) using a control signal from the controlling arithmetic circuit and a separately supplied power-supply voltage (power),
  the power line is provided such that the serial signal is transmitted to the driving controller via the power line, and
  the driving controller includes
  a rectifier circuit for separating the power-supply voltage from the transmitted serial signal and retrieving the power-supply voltage, and
  a driving arithmetic circuit that applies an arithmetic process on the control signal separated from the serial signal independently from the power-supply voltage.
(2) The actuator control system according to (1), wherein separation of the control signal from the serial signal is performed based on a branch of the power line on an upstream-side of the rectifier circuit.

(3) The actuator control system according to (2), wherein a voltage of the serial signal branched by the branch is divided by a resistor and the serial signal is retrieved as two signals with lowered voltage and current, and the serial signal is decoded to a digital signal by a comparison circuit in order to be separated as the control signal.

(4) The actuator control system according to any of (1) to (3), including a control power supply generating circuit that generates a power supply for the driving arithmetic circuit.

(5) The actuator control system according to any of (1) to (4), including a load signal generating resistor that changes a received signal regarding a drive state or position of the actuator into a load signal that can be transmitted to the controlling controller via the power line, wherein the controlling controller is provided with a load signal detecting circuit which is for detecting the load signal and which is connected to the controlling arithmetic circuit.

(6) The actuator control system according to (4) or (5), wherein in the driving controller, after receiving a data transmission request command from the controlling controller, a current is intermittently supplied to the load signal generating resistor in synchronization with a polarity change of a power supply voltage of a serial signal from the controlling controller to vary a current flowing through the controlling controller, and the controlling controller restores a signal outputted by the actuator by detecting the current variation and determining whether a bit is 0 or 1.

(7) The actuator control system according to any of (1) to (6), wherein the driving controller includes an arithmetic circuit (logic) that reverses 1 and 0 of a control signal related to the transmitted serial signal by detecting a sign upon power activation and judging a connected polarity, and improper wiring can be eliminated by the arithmetic circuit (logic).

(8) The actuator control system according to any of (1) to (7), wherein the driving controller includes an arithmetic circuit (logic) that executes a command (control) only when a setting unique to an individual actuator is consistent with an ID signal in the serial signal which matches the unique setting.

(9) The actuator control system according to any of (1) to (8), wherein two or more driving controllers are connected to a single controlling controller, each pair of the power lines consists of two power lines, and the actuator is a motor.

(10) The actuator system according to any of (1) to (9), wherein the controlling arithmetic circuit is a serial signal generator such as a computer, a microprocessor, a sequencer, and an arithmetic circuit.

(11) An actuator system including the actuator control system according to any of (1) to (10) and an actuator connected to the driving controller that constitutes the actuator control system.

(12) A motor system including the actuator control system according to (9) and a motor connected to the driving controller that constitutes the actuator control system.

Advantages of the Invention

Since the actuator control system and the actuator system according to the present invention are configured as described above, power supply to a motor and control signal transmission need no longer be performed through separate lines. Accordingly, the amount of installed wiring can be significantly reduced as compared to what is conventional and, in turn, wiring weight can be reduced and wiring operations can be significantly simplified. In addition, since only power lines remain as wiring that must be installed over long distances and wiring configuration is simplified, improper wiring can be effectively prevented. Furthermore, these effects enable a reduction in wiring installation man-hours and, in turn, a reduction in cost.

In particular, since control of a large number of motors and multiaxial control can now be performed using only a minimum of two wires, lightening of the actuator system itself can be achieved and cost can be reduced significantly.

In addition, by providing a controlling controller in the vicinity of or integrally with a serial signal generator and providing a driving controller (hereinafter, also referred to as an "actuator controller") in the vicinity of or integrally with a motor, maintenance and inspection of respective control elements that are important points in maintenance management can now be performed at nearby or same locations as devices directly connected to the respective control elements. Therefore, favorable workability and efficiency can also be achieved with respect to maintenance management.

Furthermore, with the actuator control system and the actuator system according to the present invention, a command (control) and power-supply voltage (power) are favorably composited and separated at an actuator to be realized as a favorable command to the actuator. Moreover, transmission of information regarding a trouble occurring at the actuator, information on an angle of rotation of the actuator itself, and the like to a command side can also be favorably realized.

BRIEF DESCRIPTION OF THE DRAWINGS

FIG. 2-1 is a block diagram illustrating a configuration example of an actuator control system according to the present invention;

FIG. 2-2 is a block diagram illustrating a configuration of a controlling controller in FIG. 2-1;

FIG. 2-3 is a block diagram illustrating a configuration of a driving controller in FIG. 2-1;

FIG. 3-1 is a block diagram of a controlling controller illustrating an actuator information transmission function in the actuator control system in FIG. 2-1;

FIG. 3-2 is a block diagram of a driving controller illustrating an actuator information transmission function in the actuator control system in FIG. 2-1.

DESCRIPTION OF SYMBOLS

| | |
|---|---|
| 1, 11 | actuator control system |
| 2, 12 | controlling controller |
| 21, 121 | controlling arithmetic circuit |
| 25, 125 | polarity reversion circuit |
| 128 | load signal detecting circuit |
| 3, 13, 13B, 13C | driving controller (actuator controller) |
| 31, 131 | driving arithmetic circuit |
| 36, 16 | rectifier circuit |
| 18R | Resistor |
| 17 | comparison circuit |
| 132, 132B, 132C | ID setting means (rotary switch or the like) |
| 139 | actuator driving circuit |
| 133 | control power supply generating circuit |
| 137 | load signal generating resistor |
| 30, 130, 130B, 130C | Actuator |
| 140, 140B, 140C | Sensor |
| 9, 19 | power line |

-continued

| | |
|---|---|
| 10, 110 | actuator system |
| P, 1P | power supplying means |
| 99 | power line |
| 200 | serial signal generator |
| 230A, 230B, 230C | motor controller |
| 300A, 300B, 300C | Motor |
| 330A, 330B, 330C | Encoder |
| 400 | direct-current power supply |
| 900A, 900B, 900C, 930A, 930B, 930C | Wiring |

BEST MODE FOR CARRYING OUT THE INVENTION

Hereinafter, the present invention will be described in detail with reference to the drawings.

Figure 1:
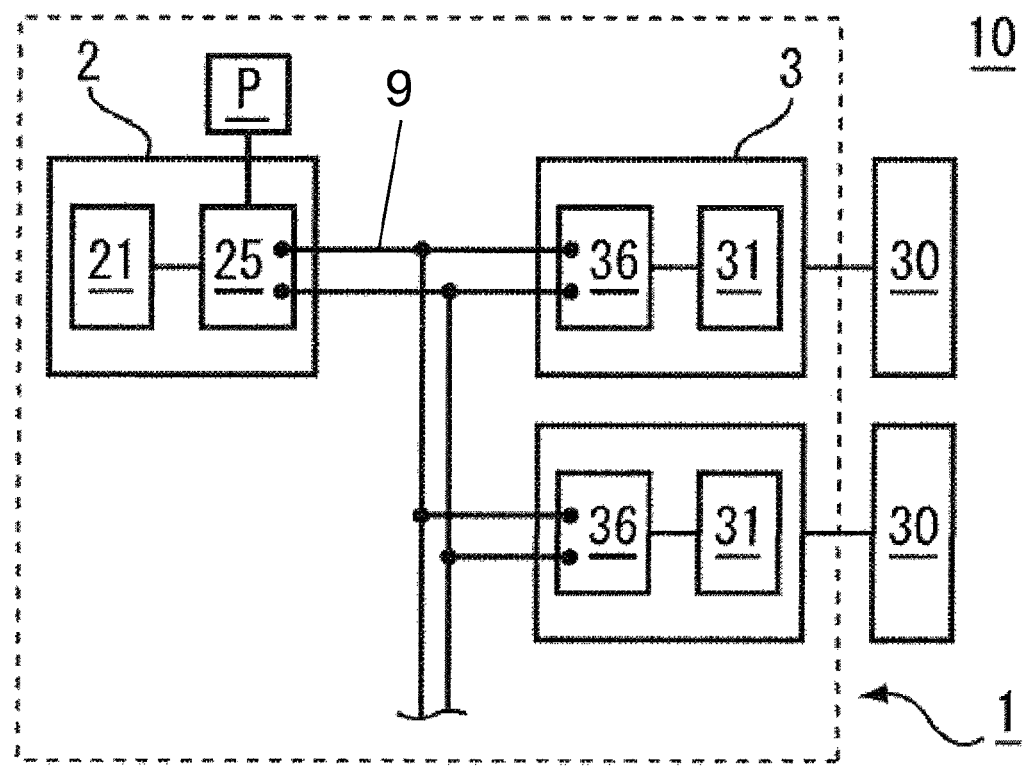
FIG. 1 is an explanatory diagram illustrating a basic configuration of an actuator control system according to the present invention.

FIG. 1 is an explanatory diagram illustrating a basic configuration of an actuator control system according to the present invention. As illustrated, the present actuator control system 1 is primarily configured so as to include a controlling controller 2, one or more driving controllers 3, and a power line 9 for connecting both controllers 2 and 3, wherein the controlling controller 2 includes a controlling arithmetic circuit 21 that generates a command signal or, in other words, a control signal for controlling an actuator 30 and a polarity reversion circuit 25 for generating a serial signal that composites a control signal and a power-supply voltage (power) using a control signal from the controlling arithmetic circuit 21 and a power-supply voltage (power) supplied separately from power supplying means P, the power line 9 is provided such that the serial signal is transmitted to the driving controller 3 via the power line 9, and the driving controller 3 includes a rectifier circuit 36 for separating the power-supply voltage from the transmitted serial signal and retrieving the power-supply voltage and a driving arithmetic circuit 31 that applies an arithmetic process on the control signal separated from the serial signal independently from the power-supply voltage. Moreover, for the controlling arithmetic circuit 21 that generates a command signal or, in other words, a control signal for controlling the actuator 30, a serial signal generator such as a computer can be used.

Due to the configuration described above, in the present actuator control system 1, the controlling arithmetic circuit 21 in the controlling controller 2 generates a command signal or, in other words, a control signal for controlling the actuator 30 and the controlling controller 2 separately receives a power-supply voltage (power) from the power supplying means P, the polarity reversion circuit 25 composites the control signal and the power-supply voltage to generate a serial signal, the power line 9 transmits the generated serial signal to one or more driving controllers 3 provided in the present actuator control system 1, and at the driving controllers 3 having received the serial signal transmission, the rectifier circuit 36 separates the power-supply voltage from the serial signal and retrieves the power-supply voltage and the driving arithmetic circuit 31 separates the control signal from the serial signal independently from the power-supply voltage to apply an arithmetic process. In this manner, a drive voltage and a drive control signal are supplied to the actuator 30 connected to the driving controller 3 of the present actuator control system 1.

Either only one driving controller 3 or two or more driving controllers 3 may be connected. While two driving controllers 3 are connected in the drawing, it is obvious that three or more driving controllers 3 can be connected to be used effectively in order to control a plurality of actuators 30.

Figure 4:
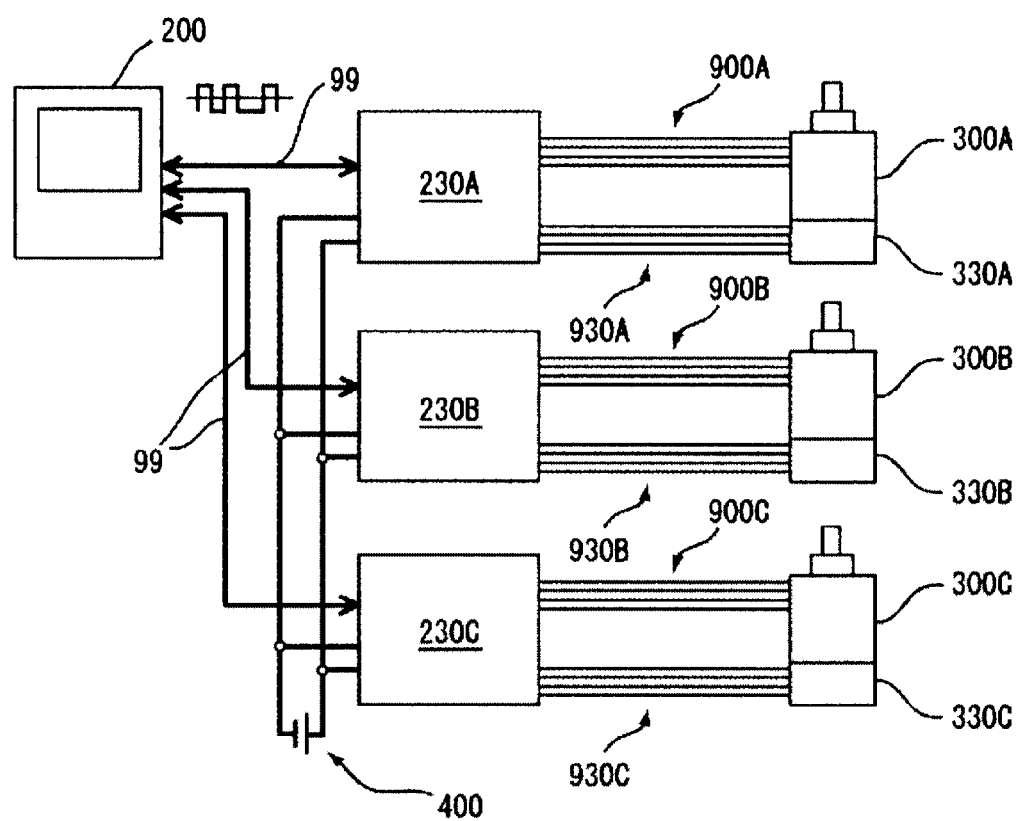
FIG. 4 is a configuration diagram illustrating an example of a conventional motor system.

A major difference in configuration of the actuator control system 1 according to the present invention from a conventional motor controller 230A and the like such as that illustrated in FIG. 4 is that a controller function for controlling actuators is distributed via the power line. In other words, the controlling controller 2 that generates a serial signal compositing a control signal from the controlling arithmetic circuit 21 and a power-supply voltage (power) from the power supplying means P and sends out the generated serial signal via the power line 9, and the driving controllers 3 which are provided on the actuators 30, 30, . . . (hereinafter simply denoted by "30") and which supply the actuators 30 with respective signals for driving and controlling the actuators 30.

In addition, a configuration is adopted in which only one controlling controller 2 need be provided for generating and transmitting a serial signal, and a serial signal compositing a power-supply voltage and a control signal is transmitted in parallel to all driving controllers 3 from the controlling controller 2 via the power line 9.

In other words, when actuators 30 are dispersed at positions separated from the controlling arithmetic circuit 21 that is a serial signal generator such as a computer and power supply and drive control are to be performed on the actuators 30, the driving controllers 3 directly responsible for providing such functions can be installed in the vicinity of the actuators 30. Alternatively, the driving controllers 3 can either be integrated into or externally attached to the actuators 30. By enabling such configurations, wiring from the motor controller to the actuators can be significantly reduced.

Moreover, the controlling arithmetic circuit 21 that is a serial signal generator or the like may constitute a part of the controlling controller 2 as illustrated, or may either be installed independently in the vicinity of the controlling controller 2 or externally attached to the controlling controller 2. In any case, wiring can be further significantly reduced.

Figures 1, 2:
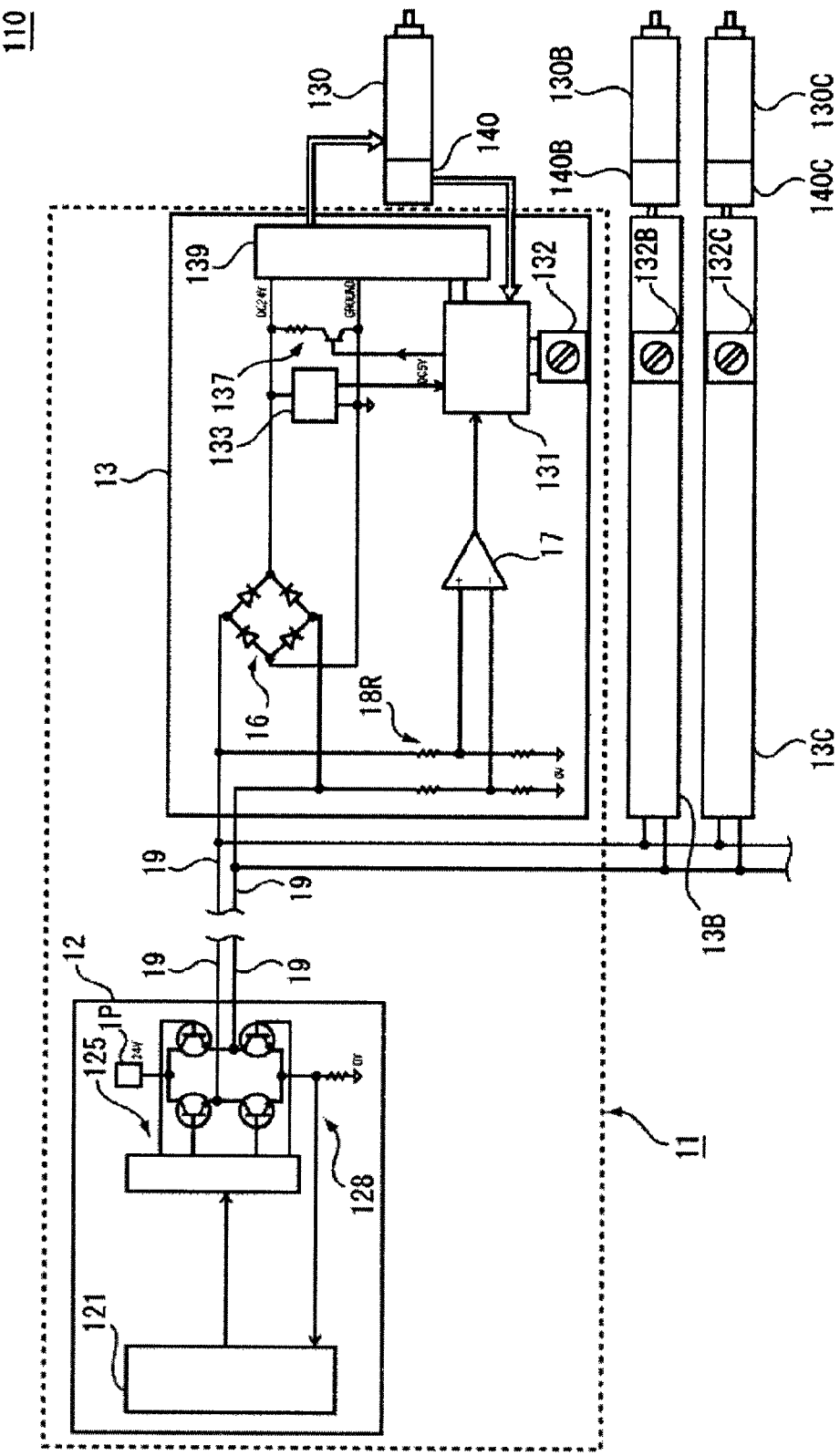
Figure 2:
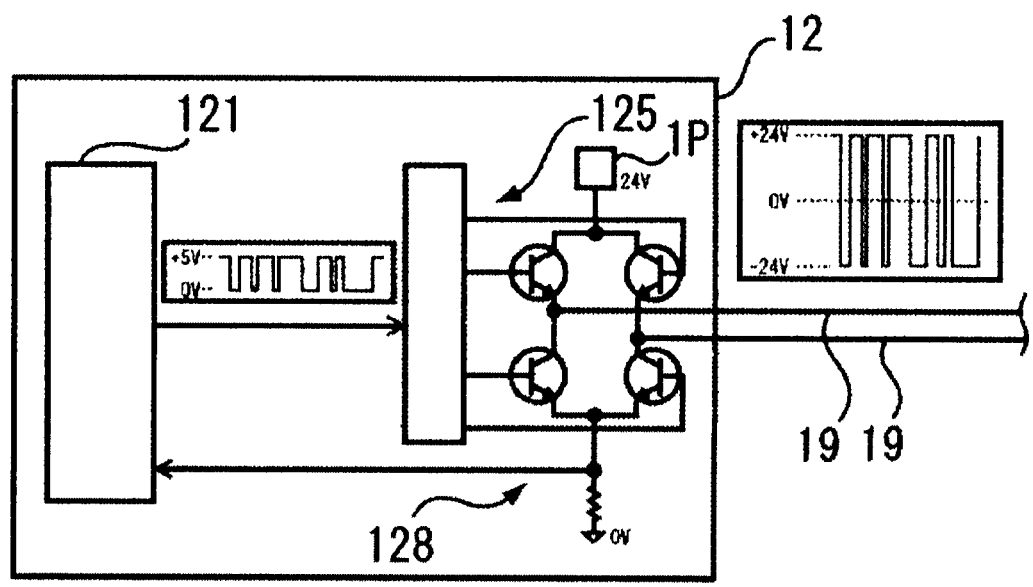
Figures 2, 3:
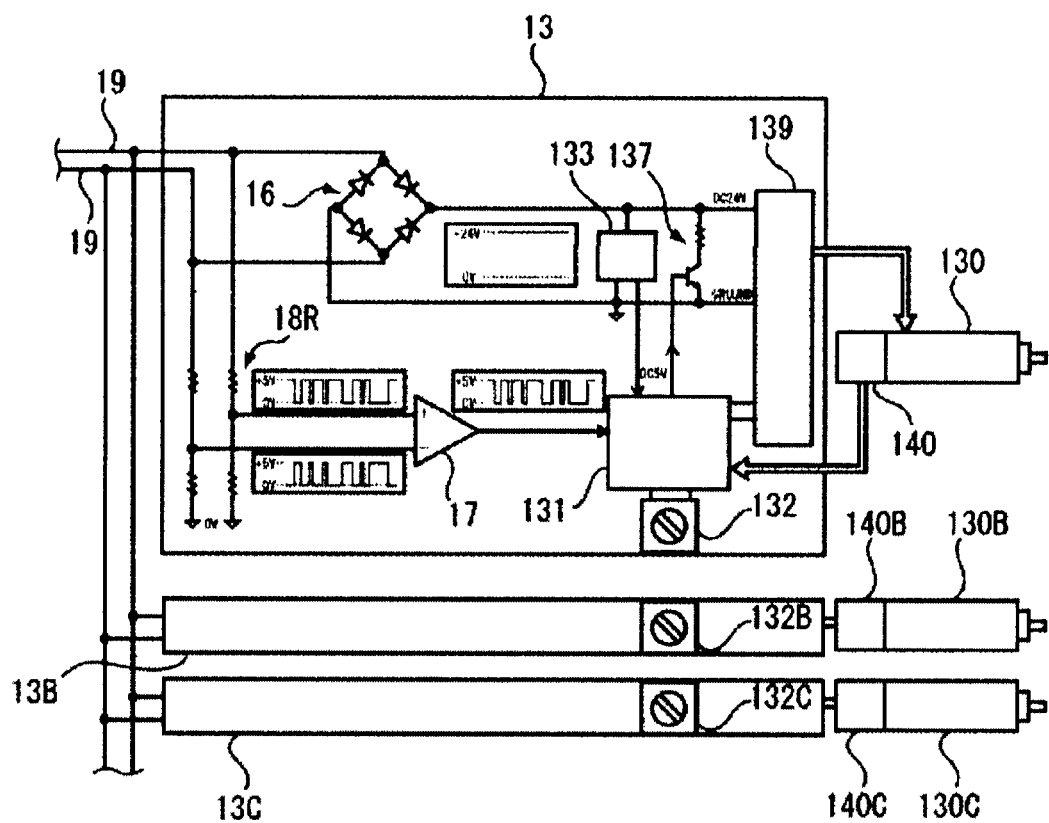
Figures 1, 3:
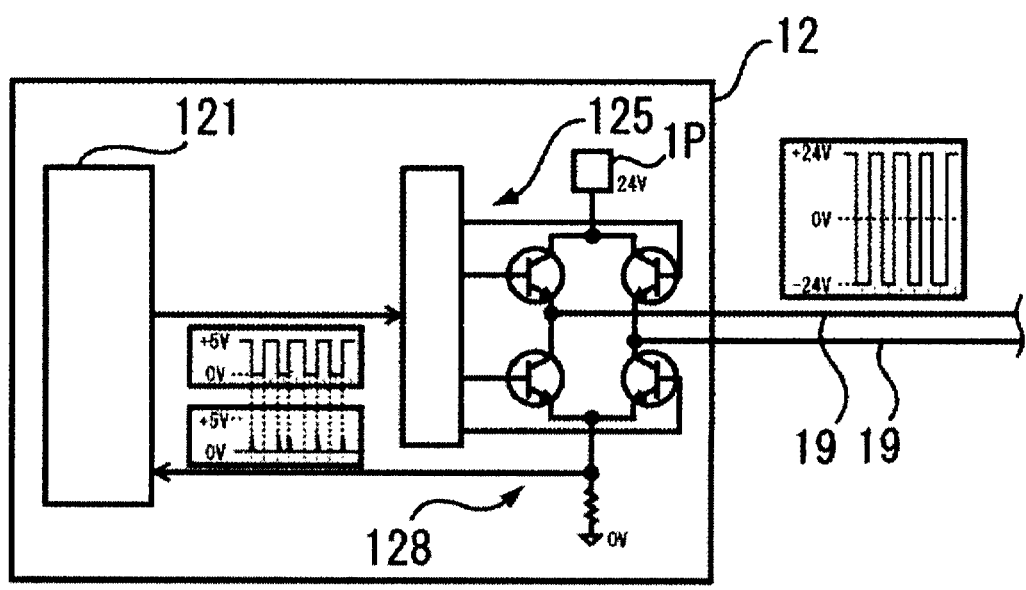
Figures 2, 3:
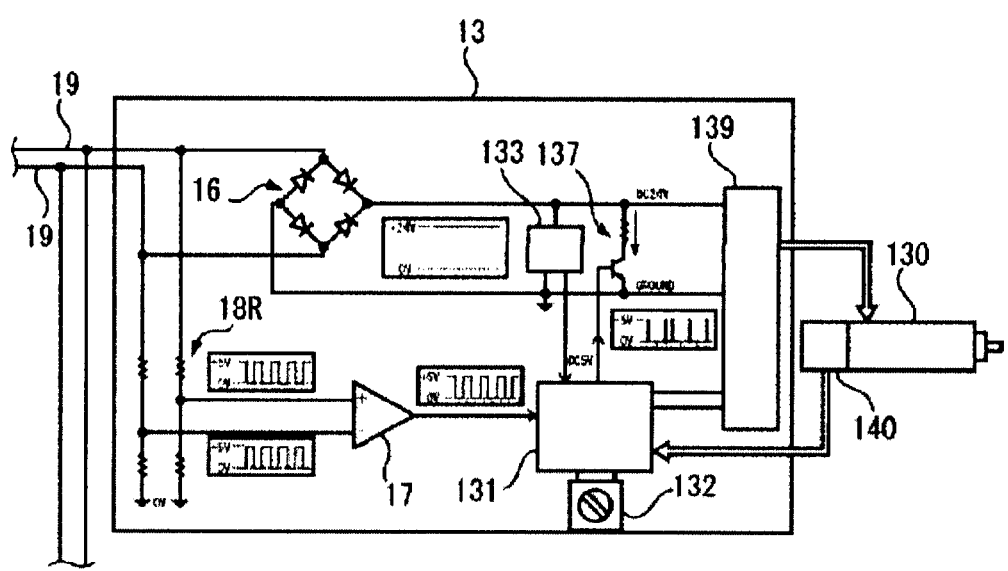

FIG. 2-1 is a block diagram illustrating a configuration example of an actuator control system according to the present invention. In addition, FIG. 2-2 is a block diagram illustrating a configuration of a controlling controller in FIG. 2-1, and FIG. 2-3 is a block diagram illustrating a configuration of a driving controller in FIG. 2-1. As illustrated in the drawings, the actuator control system 11 according to the present invention is primarily configured so as to include a controlling controller 12, one or more driving controllers 13, and a power line 19 for connecting both controllers 12 and 13, wherein the controlling controller 12 includes a controlling arithmetic circuit 121 that generates a command signal or, in other words, a control signal for controlling an actuator 130 and a polarity reversion circuit 125 for generating a serial signal that composites a control signal and a power-supply voltage (power) using a control signal from the controlling arithmetic circuit 121 and a power-supply voltage (power) supplied separately from power supplying means 1P, the power line 19 is provided such that the serial signal is transmitted to the driving controller 13 via the power line 19, and the driving controller 13 includes a rectifier circuit 16 for separating the power-supply voltage from the transmitted serial signal and retrieving the power-supply voltage and a driving arithmetic circuit 131 that applies an arithmetic process on the control signal separated from the serial signal independently from the power-supply voltage.

Moreover, for the controlling arithmetic circuit 121 that generates a command signal or, in other words, a control signal for controlling the actuator 130, a serial signal generator such as a computer, a microprocessor, a sequencer, and an arithmetic circuit can be used. In this case, the serial signal generator (121) and the controlling controller 12 may take any external positional relationship such as a form in which one is built into the other, a form in which one is externally attached to the other, and a form in which both are independent and in proximity with each other.

Due to the configuration described above, in the present actuator control system 11, the controlling arithmetic circuit 121 in the controlling controller 12 generates a command signal or, in other words, a control signal for controlling the actuator 130 and the controlling controller 12 separately receives a power-supply voltage (power) from the power supplying means 1P, the polarity reversion circuit 125 composites the control signal and the power-supply voltage to generate a serial signal, the power line 19 transmits the generated serial signal to one or more driving controllers 13 provided in the present actuator control system 11, and at the driving controllers 13 having received the serial signal transmission, the rectifier circuit 16 separates the power-supply voltage from the serial signal and retrieves the power-supply voltage and the driving arithmetic circuit 131 separates the control signal from the serial signal independently from the power-supply voltage to apply an arithmetic process. In this manner, a drive voltage and a drive control signal are supplied to the actuator 130 connected to the driving controller 13 of the present actuator control system 11.

As illustrated in FIG. 2-3, separation of a control signal from a serial signal by the driving controller 13 is performed at a circuit branched from the power line 19 at an upstream-side of the rectifier circuit 16 for retrieving power-supply voltage. In other words, separation as a control signal is achieved by dividing a voltage of a branched serial signal by a resistor 18R to retrieve two signals with lowered voltage and current and decoding the serial signal to a digital signal by a comparison circuit 17.

As illustrated, the driving controller 13 is provided with a control power supply generating circuit 133 that generates a power supply for the driving arithmetic circuit 131. A power-supply voltage separated by the rectifier circuit 16 is branched and the control power supply generating circuit 133 is provided.

Moreover, the actuator control system 11 according to the present invention may be configured such that the driving controller 13 thereof includes an arithmetic circuit (logic) that inverts "1" and "0" of a control signal related to a serial signal. In other words, by detecting a sign upon power activation of the present actuator control system 11 and judging a connected polarity, the arithmetic circuit (logic) is able to invert "1" and "0" of a control signal related to the serial signal transmitted from the controlling controller 12. Accordingly, even improper wiring can be resolved.

For example, when the actuator 130 is a motor, since a polarity of a control signal can be detected by monitoring a signal state upon activation by the driving arithmetic circuit 131 of the driving controller 13, motor connection can be performed without having to take polarity into consideration.

As a specific configuration of the arithmetic circuit (logic), a software logic or, in other words, a computer program can be used. In addition, a sequencer including such a computer program as well as other appropriate forms can be adopted.

Furthermore, the actuator control system 11 according to the present invention may be configured such that the driving controller 13 includes an arithmetic circuit (logic) that executes a command (control) from the controlling controller 12 only when settings unique to each actuator 130 are consistent with an ID signal in a serial signal conforming to the unique setting.

A serial signal includes signals necessary for rotation and other driving of the actuator 130 that is a motor such as an ID, a direction of rotation, a speed of rotation, and an amount of rotation of the actuator 130. For example, in the case of motors, each motor has an ID number set by a DIP switch or stored by the motor itself. Due to a configuration in which an arithmetic circuit (logic) that determines control execution based on an ID is provided, in the present actuator control system 11, only when an ID of a command in a serial signal (control signal) is consistent with an ID or the like of the actuator 130, command execution is determined by the arithmetic circuit (logic) and the command is executed. In other words, accordingly, the object of the present invention system of compositing a command (control) and power (power supply voltage), separating the composited command and power by the driving controller 13, and interpreting the separated command as a command capable of driving the respective actuators 130 is realized and the actuators 130 can eventually be operated. Moreover, in the example illustrated in FIG. 2-1, ID setting means 132 such as a rotary switch is provided in the driving arithmetic circuit 131.

As a specific configuration of the arithmetic circuit (logic), a software logic or, in other words, a computer program can be used. In addition, a sequencer including such a computer program as well as other appropriate forms can be adopted.

While the configuration examples of the actuator control system 11 according to the present invention illustrated in FIGS. 2-1, 2-2, and 2-3 include descriptions of examples of specific numerical values such as a current value and a graph, the present invention is not limited to such descriptions. Hereinafter, the present invention will be described once again using examples of specific numerical values and the like.

Let us assume that a power supply to be supplied to the present system 11 is direct current 24 V. The power supply is connected to a polarity reversion circuit 125 such as an H bridge which is capable of inverting polarity inside the controlling controller 12. In the polarity reversion circuit 125, a polarity of a current of a serial signal (in the illustrated example, 0 to +5 V) generated and supplied by the controlling arithmetic circuit 121 such as a microprocessor provided on a higher order than the polarity reversion circuit 125 is inverted by a command (control) from the controlling arithmetic circuit 121. In other words, by using the polarity reversion circuit 125, positive and negative of a power-supply voltage is periodically inverted based on the inputted serial signal and a necessary control signal can be generated. That is, an electrically amplified serial signal is to be generated from the controlling controller 12 of the present actuator control system 11 (a signal of ±24 V is to be generated).

The driving controller 13 includes the rectifier circuit 136 such as a diode bridge that rectifies current so as to flow in a correct direction through a circuit of the driving controller 13 even if polarity is inverted when receiving the serial signal. The current retrieved therefrom is used as power to operate the actuator 130. In the illustrated example, a power-supply voltage (power) rectified to +24 V is obtained.

On the other hand, a control signal for operating the actuator 130 is retrieved as follows. A serial signal is branched from the power line 19 on an upstream-side of the rectifier circuit 136, and a voltage of the serial signal is divided by a resistor 18R to retrieve two signals whose voltage and current have been lowered. In the illustrated example, two signals of 0 to +5 V are retrieved. The signals are further passed through a comparison circuit 17 to be decoded into a digital signal or, in other words, a control signal that is used to control operations of the actuator 130.

In the illustrated example, the two signals are decoded into 0 to +5 V control signals (reception signals) and transmitted to the driving arithmetic circuit 131. A control power supply generating circuit 133 supplies power for the driving arithmetic circuit 131. In the illustrated example, DC 5 V is supplied. Subsequently, a drive power supply and a control signal are transmitted from the driving arithmetic circuit 131 to the actuator 130 via an actuator driving circuit 139.

An arithmetic circuit (logic) for resolving improper wiring and an arithmetic circuit (logic) for determining command execution based on a consistency of an ID or the like unique to each actuator 130 and a corresponding ID included in the serial signal (control signal) are as described above.

FIG. 3-1 is a block diagram of a controlling controller illustrating an actuator information transmission function in the actuator control system in FIG. 2-1. In addition, FIG. 3-2 is a block diagram of a driving controller illustrating an actuator information transmission function in the actuator control system in FIG. 2-1. As illustrated in the drawings, a configuration can be adopted in which the driving controller 13 includes a load signal generating resistor 137 that changes a received signal related to a drive state or a position of the actuator 130 into a load signal that can be transmitted via the power line 19 to the controlling controller 12, and the controlling controller 12 includes a load signal detecting circuit 128 which is for detecting the load signal and which is connected to the controlling arithmetic circuit 121.

In the drawings, since the respective controllers 12 and 13 are configured as described above, a signal related to a drive state or a position of the actuator 130 such as a motor is sent to the driving controller 13 via an annexed detector such as an encoder or a limit switch and enters the driving arithmetic circuit 131. In response thereto, a load signal is generated at the load signal generating resistor 137 and is transmitted to the controlling controller 12 via the power line 19. Subsequently, the load signal is detected by the controlling controller 12 using the load signal detecting circuit 128 provided in the controlling controller 12. The load signal can be transmitted as a current signal.

In this case, a load of the actuator 130 such as a motor or a dedicated load resistor can be used as the load signal generating resistor 137, and due to a consumption current of the load signal generating resistor 137, a signal related to a state or a position of the actuator 13 such as a motor can be transmitted to the controlling controller 12. Specifically, a current sensor can be used as the load signal detecting circuit 128.

At the driving controller 13, after receiving a data transmission request command from the controlling controller 12, a current is intermittently supplied to the load signal generating resistor 137 in synchronization with a polarity change of a power supply voltage in the serial signal from the controlling controller 12. Accordingly, a current flowing through the controlling controller 12 is varied, and the controlling controller 12 detects the current variation and determines whether a bit is "0" or "1". As a result, the signal (a signal related to a drive state or a position) outputted by the actuator 130 is restored.

While the block diagrams of the actuator control system 11 according to the present invention illustrated in FIGS. 3-1 and 3-2 include descriptions of examples of specific numerical values such as a current value and a graph, the present invention is not limited to such descriptions. Hereinafter, the present invention will be described once again using specific numerical values and the like.

First, the controlling controller 12 includes the load signal detecting circuit 128 that is a circuit capable of monitoring a current flowing through the power line 19. When the actuator controller 13 receives a data transmission request command from the controlling controller 12, the actuator controller 13 intermittently supplies a current to the included load signal generating resistor 137 in synchronization with a periodic polarity change of a power supply by the controlling controller 12. In the illustrated example, the synchronizing signal from the controlling controller 12 that had originally been +5 V is changed to ±24 V due to a feeding of direct current-power of 24 V and by the polarity reversion circuit 125, and sent to the actuator controller 13. At the actuator controller 13, DC 24 V is intermittently supplied to the load signal generating resistor 137.

Consequently, a variation occurs in the current flowing through the controlling controller 12. The signal outputted by the actuator controller 13 can be restored by having the load signal detecting circuit 128 of the controlling controller 12 detect the current variation and determine whether a bit is "0" or "1". In the illustrated example, a +5 V signal "10110101" generated by the actuator controller 13 is detected and received at the controlling controller 12 as a signal "10110101". In this manner, the actuator 130 becomes capable of transmitting information to the controlling controller 12. In other words, information related to trouble that may occur at the actuator 130 or information regarding an angle of rotation or the like of the actuator 130 itself can be transmitted to the command side.

In FIGS. 2-1 and the like, the actuator control system 11 according to the present invention can particularly be configured such that two or more driving controllers 13 are connected to a single controlling controller 12, two power lines 19 form a pair of power lines 19, and the actuator 130 is a motor. In other words, the actuator control system 11 according to the present invention can be used as a motor control system. In the present invention, one controlling controller 12 is sufficient. This is a configuration which realizes a motor control system by providing the single controlling controller 12 with the same number of driving controllers 13 as the motors constituting the actuator system.

At minimum, a pair of two power lines 19 is sufficient for assembling the actuator control system 11. With the two power lines 19 as a core of the system, power lines can be branched out from the core to connect necessary actuators 130 such as motors and driving controllers 13 associated with the actuators 130. Therefore, a large number of actuators 130 such as motors or as many actuators 130 such as motors of various forms as needed can be connected and multiaxially controlled in an effective manner.

As illustrated in FIG. 2-1, an actuator system 110 according to the present invention includes any of the actuator control systems 1 described above and actuators 130, 130, 130B, 130C, . . . connected to driving controllers 13, 13B, 13C, . . . constituting the actuator control system 1. In the drawing, an internal configuration is illustrated only for the driving controller 13 and is otherwise omitted.

In the drawing, when motors are used as the actuators 130, the present system becomes a motor system. In this case, an encoder or the like can be integrally annexed to each motor and a limit switch can be further annexed as appropriate. Motors to be connected are not limited to any particular form and a servomotor, a stepping motor, or a DC motor may be used. In addition, a mixture of forms of motors can be connected and driven inside the present system.

INDUSTRIAL APPLICABILITY

Since the actuator control system and the actuator system according to the present invention are configured as described above, power supply to an actuator such as a motor and control signal transmission need no longer be performed through separate lines. Accordingly, the amount of installed wiring can be significantly reduced, wiring weight can be reduced, and wiring operations can be simplified. In addition, a major effect can be expected in terms of simplifying wiring configuration and preventing improper wiring. Furthermore, due to a reduction in wiring installation man-hours, cost can be trimmed.

In particular, since multiaxial control of a large number of actuators such as motors can now be performed using only a minimum of two wires, lightening of the actuator system itself can be achieved and cost can be reduced significantly. In addition, by providing a controlling controller in the vicinity of or integrally with a serial signal generator and providing a driving controller in the vicinity of or integrally with an actuator such as a motor, superior workability and efficiency can be achieved in maintenance management.

Therefore, an innovative technique can be provided in various related industrial fields such as automobile manufacturing, FA, toy manufacturing, manufacturing of various devices and instruments for research and development, and education-related devices and instruments in which control of a large number of actuators such as motors and multiaxial control by an actuator system is effective. As such, the present invention has a high industrial utility value.

The invention claimed is:

1. An actuator control system comprising a controlling controller, one or more driving controllers, and a power line for connecting the two controllers, wherein
the controlling controller includes:
a controlling arithmetic circuit that generates a command signal, namely, a control signal for actuator control, and
a polarity reversion circuit for generating a serial signal that composites a control signal and a power-supply voltage (power) using a control signal from the controlling arithmetic circuit and a separately supplied power-supply voltage (power),
the power line being provided such that the serial signal is transmitted to the driving controller via the power line, and
the driving controller includes:
a rectifier circuit for separating the power-supply voltage from the transmitted serial signal and retrieving the power-supply voltage, and
a driving arithmetic circuit that applies an arithmetic process on the control signal separated from the serial signal independently from the power-supply voltage,
an arithmetic circuit (logic) that reverses 1 and 0 of the control signal related to the transmitted serial signal by detecting a sign upon power activation and judging a connected polarity, whereby, improper wiring can be eliminated by the arithmetic circuit (logic) wherein the driving controller is provided with a load signal generating resistor that changes a received signal regarding a drive state or a position of the actuator into a load signal that can be transmitted to the controlling controller via the power line, and the controlling controller is provided with a load signal detecting circuit which is for detecting the load signal and which is connected to the controlling arithmetic circuit wherein separation of the control signal from the serial signal is performed by the driving controller and is based on a branch of the power line on an upstream-side of the rectifier circuit; and
wherein voltage of the serial signal branched by the branch is divided by a resistor and the serial signal is retrieved as two signals with lowered voltage and current, and the serial signal is decoded to a digital signal by a comparison circuit in order to be separated as the control signal.

2. The actuator control system according to claim 1, wherein two or more driving controllers are connected to a single controlling controller, a pair of the power lines comprises two power lines, and the actuator comprises a motor.

3. The actuator system according to claim 1, wherein the controlling arithmetic circuit is a serial signal generator such as a computer, a microprocessor, a sequencer, or an arithmetic circuit.

4. An actuator system comprising the actuator control system according to claim 1 and an actuator connected to the driving controller that constitutes the actuator control system.

5. A motor system comprising the actuator control system according to claim 2 and a motor connected to the driving controller that constitutes the actuator control system.

6. The actuator control system according to claim 1, comprising a control power supply generating circuit that generates a power supply for the driving arithmetic circuit.

7. An actuator control system comprising a controlling controller, one or more driving controllers, and a power line for connecting the two controllers, wherein
the controlling controller includes:
a controlling arithmetic circuit that generates a command signal, namely, a control signal for actuator control, and
a polarity reversion circuit for generating a serial signal that composites a control signal and a power-supply voltage (power) using a control signal from the controlling arithmetic circuit and a separately supplied power-supply voltage (power),
the power line being provided such that the serial signal is transmitted to the driving controller via the power line, and
the driving controller includes:
a rectifier circuit for separating the power-supply voltage from the transmitted serial signal and retrieving the power-supply voltage, and
a driving arithmetic circuit that applies an arithmetic process on the control signal separated from the serial signal independently from the power-supply voltage,
an arithmetic circuit (logic) that reverses 1 and 0 of the control signal related to the transmitted serial signal by detecting a sign upon power activation and judging a connected polarity, whereby, improper wiring can be eliminated by the arithmetic circuit (logic) wherein the driving controller is provided with a load signal generating resistor that changes a received signal regarding a drive state or a position of the actuator into a load signal that can be transmitted to the controlling controller via the power line, and the controlling controller is provided with a load signal detecting circuit which is for detecting the load signal and which is connected to the controlling arithmetic circuit wherein separation of the control signal from the serial signal is performed by the driving controller and is based on a branch of the power line on an upstream-side of the rectifier circuit; and
wherein the driving controller includes an arithmetic circuit (logic) that executes a command (control) only when a setting unique to an individual actuator is consistent with an ID signal in the serial signal which matches the unique setting.

8. The actuator control system according to claim 7, comprising a control power supply generating circuit that generates a power supply for the driving arithmetic circuit.

9. The actuator control system according to claim 8, wherein in the driving controller, after receiving a data transmission request command from the controlling controller, a current is intermittently supplied to the load signal generating resistor in synchronization with a polarity change of a power supply voltage of a serial signal from the controlling controller to vary a current flowing through the controlling controller, and the controlling controller restores a signal outputted by the actuator by detecting the current variation and determining whether a bit is 0 or 1.

* * * * *